US005767031A

United States Patent [19]

Shamshoum et al.

[11] Patent Number: 5,767,031
[45] Date of Patent: Jun. 16, 1998

[54] ZIEGLER-NATTA CATALYSTS MODIFIED WITH METALLOCENES

[75] Inventors: Edwar S. Shamshoum, Houston; David John Rauscher, Webster; Christopher G. Bauch, Seabrook, all of Tex.

[73] Assignee: Fina Technology, Inc., Dallas, Tex.

[21] Appl. No.: 474,883

[22] Filed: Jun. 7, 1995

[51] Int. Cl.$^6$ .............. B01J 31/00; B01J 37/00; C08F 4/02; C08F 4/60

[52] U.S. Cl. .............. 502/104; 502/103; 502/113; 502/117; 502/118; 502/129; 502/132; 502/133; 526/160; 526/943; 526/114; 526/119

[58] Field of Search .............. 502/104, 115, 502/118, 129, 133, 107, 110, 113, 103

[56] References Cited

U.S. PATENT DOCUMENTS

| | | | |
|---|---|---|---|
| 2,992,212 | 7/1961 | De Butts | 260/93.7 |
| 3,993,588 | 11/1976 | Thukral | 502/104 |
| 4,400,302 | 8/1983 | Goodall et al. | 502/104 |
| 4,464,478 | 8/1984 | Scata et al. | 502/104 |
| 4,497,905 | 2/1985 | Nozaki | 502/104 |
| 4,686,199 | 8/1987 | Tachikawa et al. | 502/104 |
| 4,698,323 | 10/1987 | Band et al. | 502/133 |
| 4,701,432 | 10/1987 | Welborn, Jr. | 502/113 |
| 4,804,648 | 2/1989 | Job | 502/118 |
| 4,808,561 | 2/1989 | Welborn, Jr. | 502/104 |
| 4,839,321 | 6/1989 | Murai et al. | 502/133 |
| 4,847,227 | 7/1989 | Murai et al. | 502/129 |
| 5,032,562 | 7/1991 | Lo et al. | 502/113 |
| 5,145,922 | 9/1992 | Villena et al. | 502/104 |
| 5,260,244 | 11/1993 | Pettijohn | 502/110 |
| 5,308,815 | 5/1994 | Sangokoya | 502/104 |
| 5,547,912 | 8/1996 | Kataoka et al. | 502/115 |
| 5,614,456 | 3/1997 | Mink et al. | 502/115 |
| 5,627,117 | 5/1997 | Mukaiyama et al. | 502/133 |
| 5,691,264 | 11/1997 | Sacchetti et al. | 502/133 |

FOREIGN PATENT DOCUMENTS

| 0412750 | 8/1989 | European Pat. Off. . |
|---|---|---|
| 0436328 | 7/1991 | European Pat. Off. . |

OTHER PUBLICATIONS

G. Lock, "Thermoplastic Elastomers Based on Block Copolymers of Ethylene and Propylene", in R. Seymour and T. Cheng, eds., Advances in Polyolefins, Plenum Press, New York, pp. 59–74, unknown.

*Primary Examiner*—Glenn Caldarola
*Assistant Examiner*—J. Pasterczyk
*Attorney, Agent, or Firm*—Jim D. Wheelington; M. Norwood Cheairs

[57] ABSTRACT

This invention relates to a process for making a catalyst in which a metallocene is included in the synthesis of a Ziegler-Natta catalyst and a process for using the catalyst in the polymerization of olefins, specifically, propylene, to produce a polymer product with broad polydisperisty.

The catalyst may be synthesized by:

1) selecting a solid component comprising a magnesium dialkoxide;
2) adding a chlorinating agent;
3) adding a titanating agent;
4) adding a metallocene prior to step 2), after step 2), prior to step 3) or after step 3) and
5) adding an aluminum alkyl cocatalyst.

49 Claims, No Drawings

ZIEGLER-NATTA CATALYSTS MODIFIED WITH METALLOCENES

BACKGROUND OF THE INVENTION

1. Field of the Invention

This invention relates to a catalyst system for the polymerization of olefins, particularly, to a catalyst system comprising a supported Ziegler-Natta catalyst which has been modified with metallocene, preferably during synthesis. The catalyst system is used to polymerize a-olefins, such as propylene.

2. Description of the Prior Art

Polyolefin manufacturing processes typically involve the polymerization of olefin monomer with an organometallic catalyst of the Ziegler-Natta type. Catalyst systems for the polymerization of olefins are well known in the art. Typically, these systems include a Ziegler-Natta type polymerization catalyst component; a co-catalyst, usually an organoaluminum compound; and an external electron donor compound or selectivity control agent, usually an organosilicon compound. Examples of such catalyst systems are shown in the following U.S. Pat. Nos.: 4,107,413; 4,294,721; 4,439,540; 4,115,319; 4,220,554; 4,460,701; and 4,562,173; the disclosures of these patents are hereby incorporated by reference.

A Ziegler-Natta type polymerization catalyst is basically a complex derived from a halide of a transition metal, for example, titanium, chromium or vanadium with a metal hydride and/or a metal alkyl, typically an organoaluminum compound, as a co-catalyst. The catalyst is usually comprised of a titanium halide supported on a magnesium compound complexed with an alkylaluminum co-catalyst.

It is known that two or more homogeneous catalysts, such as those based on metallocene compounds, may be combined to effect properties, such as molecular weight distribution. U.S. Pat. No. 4,530,914 discloses use of a catalyst system comprising two or more metallocenes in the polymerization of α-olefins, primarily ethylene, to obtain a broad molecular weight distribution. The metallocenes each have different propagation and termination rate constants. The metallocenes are mixed with an alumoxane to form the catalyst system.

It is also known that metallocenes may be affixed to a support to simulate a heterogeneous catalyst. U.S. Pat. No. 4,808,561 discloses reacting a metallocene with an alumoxane and forming a reaction product in the presence of a support. The support is a porous material like talc, inorganic oxides such as Group IIA, IIIA IVA or IVB metal oxides like silica, alumina, silica-alumina, magnesia, titania, zirconia and mixtures thereof, and resinous material such as polyolefins, e.g., finely divided polyethylene. The metallocenes and alumoxanes are deposited on the dehydrated support material.

In U.S. Pat. No. 4,701,432 a support is treated with at least one metallocene and at least one non-metallocene transition metal compound. To form a catalyst system a cocatalyst comprising an alumoxane and an organometallic compound of Group IA, IIA, IIB and IIIA is added to the supported metallocene/non-metallocene. The support is a porous solid such as talc or inorganic oxides or resinous materials, preferably an inorganic oxide, such as silica, alumina, silica-alumina, magnesia, titania or zirconia, in finely divided form. By depositing the soluble metallocene on the support material it is converted to a heterogeneous supported catalyst. The transition metal compound, such as $TiCl_4$, is contacted with the support material prior to, after, simultaneously with or separately from contacting the metallocene with the support.

It is known that $Cp_2TiCl_2$ in the presence of alkylaluminum compounds polymerizes ethylene but not propylene whereas in the presence of methylalumoxane (MAO) $Cp_2TiCl_2$ polymerizes propylene also to produce atactic polypropylene. Combination of dimethyl titanocene and its Cp-substituted analogues and $TiCl_3$ for propylene polymerizations has been reported in U.S. Pat. No. 2,992,212 and in "Thermoplastic Elastomers Based on Block Copolymers of Ethylene and Propylene", G. A. Lock, Advances in Polyolefins, p. 59–74, Raymond B. Seymour, Ed. MAO was not used in this polymerization.

It would be advantageous to change polymer properties in a polymerization processes by using a supported Ziegler-Natta catalyst which has been modified by metallocene compound.

SUMMARY OF THE INVENTION

Accordingly, an object of this invention is to change polymer properties in polymerization processes using a supported Ziegler-Natta catalyst which has been modified with a metallocene compound.

Also, an object of this invention is to produce a polyolefin having high molecular weight and broad molecular weight distribution.

These and other objects are accomplished by a catalyst system comprising a supported Ziegler-Natta catalyst modified with a metallocene compound as an additive used in a polymerization process for polymerizing olefins, especially propylene.

DETAILED DESCRIPTION OF THE INVENTION

The present invention provides for a catalyst for polymerization of olefins comprising:

a) a supported Ziegler-Natta transition metal catalyst component modified with a metallocene compound as an additive in the synthesis of the catalyst component;

c) an aluminum trialkyl co-catalyst; and d) an external electron donor.

The present invention also provides a process for the polymerization of olefins using the catalyst system described above comprising:

a) selecting a conventional Ziegler-Natta transition metal catalyst component modified with a metallocene compound;

b) contacting the catalyst component with an organoaluminum co-catalyst compound;

c) contacting the catalyst component with an electron donor either after or simultaneously with step b) to form a catalyst system;

d) introducing the catalyst system into a polymerization reaction zone containing a monomer under polymerization reaction conditions to form a polymer product; and e) extracting polymer product from the polymerization reaction zone.

The polymer product extracted from the reactor has a broad molecular weight distribution.

A Ziegler-Natta catalyst may be pre-polymerized to improve the performance of the catalyst. Generally, a pre-polymerization process is effected by contacting a small amount of monomer with the catalyst after the catalyst has been contacted with the electron donor. A prepolymerization process is described in U.S. Pat. Nos. 4,767,735, 4,927,797 and 5,122,583, hereby incorporated by reference.

Any of the conventional supported Ziegler-Natta transition metal compound catalyst components can be used in the present invention. The transition metal compound is preferably of the general formula $MR^1_x$ where M is the metal, $R^1$ is a halogen or a hydrocarbyloxy and x is the valence of the metal. Preferably, M is a Group IVB metal, and most preferably titanium. Preferably, $R^1$ is chlorine, bromine, an alkoxy or a phenoxy, more preferably chlorine or ethoxy and most preferably, chlorine. Illustrative examples of the transition metal compounds are $TiCl_4$, $TiBr_4$, $Ti(OC_2H_5)_3Cl$, $Ti(OC_2H_5)_3Cl$, $Ti(OC_3H_7)_2Cl_2$, $TiO(C_6H_{13})_2Cl_2$, $Ti(OC_2H_5)_2Br_2$, and $Ti(OC_{12}H_{25})Cl_3$. Mixtures of the transition metal compounds may be used. No restriction on the number of transition metal compounds is made as long as at least one transition metal compound is present.

The support should be an inert solid which is chemically unreactive with any of the components of the conventional Ziegler-Natta Catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

The organoaluminum co-catalyst is preferably an aluminum alkyl of the formula $AlR^{\wedge}_3$ where $R^{\wedge}$ is an alkyl having 1–8 carbon atoms, $R^{\wedge}$ being the same or different. Examples of aluminum alkyls are trimethyl aluminum (TMA), triethyl aluminum (TEAl) and triisobutyl aluminum (TiBAl). The preferred aluminum alkyl is TEAl.

The term "electron donor" as used herein, refers to the external electron donor or selectivity control agent (SCA). The external electron donor acts as a stereoregulator to control the amount of atactic form of polymer produced. It may also increase the production of isotactic polymers. The electron donor for the present invention is any one of the stereoselectivity control agents which are effective with Ziegler-Natta catalysts. Typically, an electron donor is an organosilicon compound.

The electron donors included in the present invention are organic silicon compounds such as those described by the following formula:

where R is an alkyl group, a cycloalkyl group, an aryl group or a vinyl group. $R^*$ is an alkyl group, m is 0–4, R may be the same or different. $R^*$ may be the same or different. Examples of electron donors are cyclohexylmethyldimethoxysilane (CMDS), diphenyldimethoxysilane (DPMS) and isobutyl trimethoxysilane (IBMS). Other examples of electron donors are disclosed in U.S. Pat. Nos. 4,218,339; 4,395,360; 4,328,122; 4,473,660; 4,562,173 and 4,547,552, which are hereby incorporated by reference. The preferred electron donor is CMDS.

The metallocene compound may be a cyclopentadienide, i.e., a metal derivative of a cyclopentadiene. The metallocene should contain at least one cyclopentadiene ring and be of the general formula:

where Cp is a cyclopentadienyl ring, R and R' are substituents on the cyclopentadienyl rings and can be a hydride or a hydrocarbyl from 1–9 carbon atoms, each R and R' being the same or different, each $(CpR_{5-n})$ and $(CpR'_{5-n})$ being the same or different, a and b are 0 or 1, indicating whether the particular Cp ring is present, but at least one of a or b must be 1; R" is a structural bridge between $(CPR_{5-n})_a$ and $(CpR'_{5-n})_b$ to impart stereorigidity, n being 1 or 0 to indicate whether the bridge is present or not and when n=1, a and b both must equal 1; M' is Group IVB metal, R* is a hydride, a halogen or a hydrocarbyl from 1–20 carbon atoms, v is the valence of M'. Preferably, a is 1 and b is 1, $(CpR_{5-n})$ and $(CpR'_{5-n})$ are the same and are cyclopentadienyl rings such that they are unsubstituted cyclopentadienyl and n is 0, i.e., unbridged. Preferably, M' is titanium, which has a valence of 4. Preferably, R* is a halogen or alkyl, most preferably chloride or methyl.

The standard synthesis procedure is:

a) selecting a solid component comprising magnesium dialkoxide of the general formula $Mg(OR^2)_2$ where $R^2$ is a hydrocarbyl or substituted hydrocarbyl of 1 to 20 carbon atoms;

b) adding a chlorinating agent; and c) adding a titanating agent.

The synthesis procedure for Ziegler-Natta type catalysts for the polymerization of olefins is disclosed in U.S. Pat. Nos. 3,574,138; 3,642,746; 4,069,169; 4,226,741; 4,636,486; 4,816,433; 4,839,321 and 4,927,797, the disclosures of which are hereby incorporated. The present invention modifies the synthesis procedure, and thus modifies the catalyst, by adding a metallocene compound during the synthesis process. The specific synthesis procedure used was:

a) selecting a solid component comprising magnesium diethoxide;

b) adding titanium tetrachloride;

c) heating to promote reaction;

d) washing with heptane;

e) adding titanium tetrachloride;

f) heating to promote reaction;

g) drying in a vacuum.

The metallocene compound was added 1) prior to the first addition of titanium tetrachloride, 2) during heating following the first addition of titanium tetrachloride, 3) prior to the second addition of the titanium tetrachloride or 4) during heating following the second addition of titanium tetrachloride.

The amount of metallocene added is such that a molar ratio of titanium tetrachloride added in either steps b) or e) to metallocene (Ti/Cp) is at least 5, preferably about 5 to about 200, more preferably about 20 to about 100 and most preferably is about 100.

The invention having been generally described, the following examples are given as particular embodiments of the invention and to demonstrate the practice and advantages thereof. It is understood that the examples are given by way of illustration and are not intended to limit the specification or the claims to follow in any manner.

PREPARATION OF THE CATALYST

COMPARATIVE EXAMPLE

A round-bottom flask having a capacity of 500 ml and provided with a stirrer, the inner atmosphere of which was sufficiently substituted with nitrogen gas, was charged at room temperature with 10 g of diethoxy magnesium and 80 ml of toluene to form a slurry. The slurry was heated to 90° C. on an oil bath. Next, 20 ml of $TiCl_4$ were added dropwise to the slurry while stirring. Then, 2.7 ml of n-butyl phthalate were added and the temperature was further elevated to 115° C. and maintained for two hours with stirring. After cooling to 90° C., stirring ceased and precipitate was allowed to settle. The solid was separated and washed twice with 200 ml of toluene. While maintaining the temperature at 90° C., the solid was slurried in 80 ml of toluene. 20 ml of $TiCl_4$ were added dropwise to the composition and the resulting mixture was heated with stirring to a temperature of 115° C. which was maintained for 2 hours. After the reaction, the composition was cooled to 90° C., stirring ceased and the solid allowed to settle. The solid was separated, the temperature decreased to 40° C. and was washed five times with 150 ml of n-heptane. The resulting catalyst component was dried in vacuum with heat to 35°–40° C. to yield a dry powder.

EXAMPLE 1

The catalyst was synthesized using the procedure of the Comparative Example except after the addition of diethoxy magnesium and toluene and before adding $TiCl_4$, 9.2 mmoles of $Cp_2TiCl_2$ was added as a slurry in toluene at room temperature.

EXAMPLE 2

The catalyst was synthesized using the procedure of Example 1 except that 1.8 moles of $Cp_2TiCl_2$ was used.

EXAMPLE 3

The catalyst was synthesized using the procedure of the Comparative Example except after the addition of diethoxy magnesium, toluene, $TiCl_4$ and n-butyl phthalate, 18.5 mmoles of $Cp_2TiCl_2$ was added after one hour of heating at 115° C.

EXAMPLE 4

The catalyst was synthesized using the procedure of Example 3 except that 9.2 mmoles of $Cp_2TiCl_2$ was used.

EXAMPLE 5

The catalyst was synthesized using the procedure of Example 3 except that 1.8 mmoles of $Cp_2TiCl_2$ was used.

EXAMPLE 6

The catalyst was synthesized using the procedure of the Comparative Example except prior to the second addition of $TiCl_4$, 4.6 mmoles of $CP_2TiCl_2$ was added at 90° C. with stirring for fifteen minutes.

EXAMPLE 7

The catalyst was synthesized using the procedure of Example 6 except that 1.8 mmoles of $Cp_2TiCl_2$ was used.

EXAMPLE 8

The catalyst was synthesized using the procedure of Example 6 except that 0.9 mmoles of $CP_2TiCl_2$ was used.

EXAMPLE 9

The catalyst was synthesized using the procedure of Example 6 except that 0.45 mmoles of $Cp_2TiCl_2$ was used.

EXAMPLE 10

The catalyst was synthesized using the procedure of the Comparative Example except after the second addition of $TiCl_4$ and heating at 115° C. with stirring for 1 hour, 1.8 mmoles of $Cp_2TiCl_2$ was added and the heating and stirring continued for another hour.

SUMMARY OF POLYMERIZATION CONDITIONS wt. of catalyst: 10.0 mgrams amount of TEAl (co-catalyst): 1.0 mmoles Al/Ti ratio 200* amount of CMDS (donor): 0.02 and 0.10 mmoles

Al/Si ratio 50 and 10, respectively

Hydrogen 16 mmoles

Propylene: 720g (1.4L)

Temp.: 70° C.

Time: 60 mins.

* excluding titanium from metallocene

Prior to a polymerization run, all traces of moisture and air were expelled from a 2 L reactor by heating to a temperature over 100° C. for a minimum of 30 minutes under a constant purge of dry nitrogen. Following this heating, the reactor was cooled to room temperature (25° C.) under nitrogen. The reactor was stabilized at room temperature and then the hydrogen and 1.0 L of propylene were added. The reactor was then stirred at 1000 rpm. The TEAl co-catalyst and the CMDS electron donor were added to a 40 cc tubular reaction vessel. A catalyst as prepared in the Examples above was slurried in mineral oil suspension and added to the 40 cc reaction vessel. The co-catalyst/electron donor mixture was allowed to precontact approximately five minutes, and the final mixture with catalyst was allowed to contact for approximately two minutes prior to use. The 40 cc reaction vessel was then attached to an entry point on the 2 L reactor and the catalyst mixture was flushed into the 2 L reactor with room temperature liquid propylene. The reactor temperature was then raised to 70° C. The total amount of propylene present in the reactor was about 1.4 L. The polymerization reaction was allowed to proceed for one hour, at which point it was terminated by venting the excess propylene and cooling the reactor to room temperature. The reactor was then opened to collect the polymer product which was dried and analyzed. The molecular weight distribution or polydispersity (D) given as the ratio of weight-average to number-average molecular weight (Mw/Mn) was determined by gel permeation chromatography (GPC). The polymerization results are tabulated in Table 1.

TABLE 1

| Example | Ti/Cp | D (Mw/Mn) |
|---|---|---|
| Comparative | 0 | 6.48 |
| 1 | 10 | 11.0* |
| 2 | 50 | 8.54 |
| 3 | 5 | 9.62 |
| 4 | 10 | 14.4* |
| 5 | 50 | 10.71 |
| 6 | 20 | 14.96 |
| 7 | 50 | 13.9* |
| 8 | 100 | 18.8* |
| 9 | 200 | 14.78 |
| 10 | 50 | 10.38 |

*Average results of more than one run at the same conditions

The data above indicates that addition of a metallocene in the synthesis of a catalyst broadens the polydispersity of polypropylene. Preferably, the metallocene is added prior to the second addition of titanium tetrachloride.

Obviously, numerous modifications and variations of the present invention are possible in light of the above teachings. It is therefore to be understood that within the scope of the appended claims, the invention may be practiced otherwise than as specially described herein.

What is claimed as new and desired to be secured by Letter of Patent of the United States of America is:

1. A process for synthesizing a catalyst comprising:
   1) selecting a solid component comprising a magnesium dialkoxide;
   2) adding a chlorinating agent;
   3) adding a titanating agent;
   wherein a metallocene of the general formula:

where Cp is a cyclopentadienyl ring, R and R' are substituents on the cyclopentadienyl rings and are a hydride or a hydrocarbyl from 1–9 carbon atoms, each R and R' being the same or different, each $(CpR_{5-n})$ and $(CpR'_{5-n})$ being the same or different, a and b are 0 or 1, indicating whether the particular Cp ring is present, but at least one of a or b must be 1; R" is a structural bridge between $(CpR'_{5-n})_a$ and $(CpR_{5-n})_b$, n being 1 or 0 to indicate whether the bridge is present or not; M' is a Group IVB metal, R* is a hydride, a halogen or a hydrocarbyl from 1–20 carbon atoms, v is the valence of M'; is added prior to step 2), after step 2), prior to step 3) or after step 3) and
   4) adding a cocatalyst consisting of an aluminum alkyl.

2. The process of claim 1 wherein the chlorinating agent is titanium tetrachloride and the titanating agent is titanium tetrachloride.

3. The process of claim 2 wherein the molar ratio of titanium tetrachloride to metallocene (Ti/Cp) at step 2) or after 3) is at least 5.

4. The process of claim 3 wherein the molar ratio of titanium tetrachloride to metallocene is 5 to 200.

5. The process of claim 4 wherein the molar ratio of titanium tetrachloride to metallocene is about 20 to about 100.

6. The process of claim 5 wherein the molar ratio of titanium tetrachloride to metallocene is about 100.

7. The process of claim 1 wherein the titanating agent is titanium tetrachloride.

8. The process of claim 1 wherein the chlorinating agent is titanium tetrachloride.

9. The process of claim 1 wherein the metallocene compound was added prior to the addition of the titanating agent.

10. A process for making a catalyst as recited in claim 1 wherein $(CpR_{5-n})$ and $(CpR'_{5-n})$ are the same and are unsubstituted cyclopentadienyl.

11. A process for making a catalyst as recited in claim 1 wherein the metallocene compound is bis(cyclopentadienyl) titanium dichloride.

12. The process of claim 1 wherein the aluminum alkyl cocatalyst is of the formula $AlR^\wedge_3$ where $R^\wedge$ is an alkyl having 1–8 carbon atoms, $R^\wedge$ being the same or different.

13. The process of claim 12 wherein the aluminum alkyl cocatalyst is trimethyl aluminum, triethyl aluminum or triisobutyl aluminum.

14. The process of claim 13 wherein the aluminum alkyl cocatalyst is triethyl aluminum.

15. The process of claim 1 wherein the process additionally comprises adding an external electron donor either after or simultaneously with the cocatalyst.

16. The process of claim 15 wherein the external donor is described by the formula $SiR_m(OR^\#)_{4-m}$ where R is an alkyl group, a cycloalkyl group, an aryl group or a vinyl group, $R^\#$ is an alkyl group, m is 0–4, R may be the same or different and $R^\#$ may be the same or different.

17. The process of claim 16 wherein the external donor is cyclohexylmethyldimethoxysilane, diphenyldimethoxysilane or isobutyltrimethoxysilane.

18. The process of claim 17 wherein the external donor is cyclohexylmethyldimethoxysilane.

19. The process of claim 1 wherein the process additionally comprises heating after the addition of the chlorinating agent.

20. The process of claim 19 wherein the process additionally comprises washing with heptane after heating.

21. The process of claim 1 wherein the process additionally comprises heating after addition of the titanating agent.

22. The process of claim 21 wherein the process additionally comprises drying in a vacuum after heating.

23. The process of claim 8 wherein the metallocene compound was added prior to the addition of the chlorinating agent.

24. The process of claim 19 wherein the metallocene compound was added during heating.

25. The process of claim 20 wherein the metallocene compound is added during heating.

26. A catalyst made by combining in order:
   1) a solid component comprising a magnesium dialkoxide;
   2) a metallocene,
   3) a chlorinating agent;
   4) a titanating agent; and
   5) a cocatalyst consisting of an aluminum alkyl or
   1) a solid component comprising a magnesium dialkoxide;
   2) a chlorinating agent;
   3) a metallocene;
   4) a titanating agent; and
   5) a cocatalyst consisting of an aluminum alkyl or
   1) a solid component comprising a magnesium dialkoxide;
   2) a chlorinating agent;
   3) a titanating agent;
   4) a metallocene; and
   5) a cocatalyst consisting of an aluminum alkyl wherein the metallocene is of the general formula:

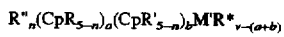

where Cp is a cyclopentadienyl ring, R and R' are substituents on the cyclopentadienyl rings and are a hydride or a hydrocarbyl from 1–9 carbon atoms, each R and R' being the same or different, each $(CpR_{5-n})$ and $(CpR'_{5-n})$ being the same or different, a and b are 0 or 1, indicating whether the particular Cp ring is present, but at least one of a or b must be 1;R" is a structural bridge between $(CpR_{5-n})_a$ and $(CpR'_{5-n})_b$, n being 1 or 0 to indicate whether the bridge is present or not; M' is a Group IVB metal, R* is a hydride, a halogen or a hydrocarbyl from 1–20 carbon atoms, v is the valence of M'.

27. The catalyst of claim 26 wherein $(CpR_{5-n})$ and $(CpR'_{5-n})$ are the same and are unsubstituted cyclopentadienyl.

28. The catalyst of claim 26 wherein the metallocene compound is bis(cyclopentadienyl) titanium dichloride.

29. The catalyst of claim 26 wherein the aluminum alkyl cocatalyst is of the formula AlR^3 where R^ is an alkyl having 1–8 carbon atoms, R^ being the same or different.

30. The catalyst of claim 29 wherein the aluminum alkyl cocatalyst is trimethyl aluminum, triethyl aluminum or triisobutyl aluminum.

31. The catalyst of claim 30 wherein the aluminum alkyl cocatalyst is triethyl aluminum.

32. The catalyst of claim 26 wherein the catalyst additionally comprises an external electron donor added either after or with the cocatalyst.

33. The catalyst of claim 32 wherein the external electron donor is described by the formula $SiR_m(OR^\#)_{4-m}$ where R is an alkyl group, a cycloalkyl group, an aryl group or a vinyl group, $R^\#$ is an alkyl group, m is 0–4, R may be the same or different and $R^\#$ may be the same or different.

34. The catalyst of claim 33 wherein the external donor is cyclohexylmethyldimethoxysilane, diphenyldimethoxysilane or isobutyltrimethoxysilane.

35. The catalyst of claim 34 wherein the external donor is cyclohexylmethyldimethoxysilane.

36. The catalyst of claim 26 wherein the catalyst is made by combining in order:
   1) a solid component comprising a magnesium dialkoxide;
   2) a metallocene;
   3) a chlorinating agent;
   4) a titanating agent; and
   5) a cocatalyst consisting of an aluminum alkyl.

37. The catalyst of claim 26 wherein the catalyst is made by combining in order:
   1) a solid component comprising a magnesium dialkoxide;
   2) a chlorinating agent;
   3) a metallocene;
   4) a titanating agent; and
   5) a cocatalyst consisting of an aluminum alkyl.

38. The catalyst of claim 26 wherein the catalyst is made by combining in order:
   1) a solid component comprising a magnesium dialkoxide;
   2) a chlorinating agent;
   3) a titanating agent;
   4) a metallocene; and
   5) a cocatalyst consisting of an aluminum alkyl.

39. The catalyst of claim 26 wherein the chlorinating agent is titanium tetrachloride.

40. The catalyst of claim 26 wherein the titanating agent is titanium tetrachloride.

41. The catalyst of claim 26 wherein the chlorinating agent is titanium tetrachloride and the titanating agent is titanium tetrachloride.

42. The catalyst of claim 41 wherein the molar ratio of titanium tetrachloride to metallocene (Ti/Cp) is at least 5.

43. The catalyst of claim 42 wherein the molar ratio of titanium tetrachloride to metallocene is 5 to 200.

44. The catalyst of claim 43 wherein the molar ratio of titanium tetrachloride to metallocene is about 20 to about 100.

45. The catalyst of claim 44 where the molar ratio of titanium tetrachloride to metallocene is about 100.

46. A process for synthesizing a catalyst comprising:
   a) selecting a solid component comprising a magnesium dialkoxide;
   b) adding a metallocene compound;
   c) adding a chlorinating agent;
   d) heating to promote reaction;
   e) adding a titanating agent; and
   f) heating to promote reaction.

47. A process for synthesizing a catalyst comprising:
   a) selecting a solid component comprising a magnesium dialkoxide;
   b) adding a chlorinating agent;
   c) heating to promote reaction while adding a metallocene compound;
   d) adding a titanating agent; and
   e) heating to promote reaction.

48. A process for synthesizing a catalyst comprising:
   a) selecting a solid component comprising a magnesium dialkoxide;
   b) adding a chlorinating agent;
   c) heating to promote reaction;
   d) adding a metallocene compounds
   e) adding a titanating agent; and
   f) heating to promote reaction.

49. A process for synthesizing a catalyst comprising:
   a) selecting a solid component comprising a magnesium dialkoxide;
   b) adding a chlorinating agent;
   c) heating to promote reaction;
   d) adding a titanating agent; and
   e) heating to promote reaction while adding a metallocene compound.

* * * * *